Dec. 9, 1969          F. L. J. REHFELD          3,482,766
VACUUM OPERATED MOTOR AND PUMP COMBINATION
Filed Nov. 13, 1967                                4 Sheets-Sheet 1

INVENTOR.
Frederick L. J. Rehfeld
BY
George E. Johnson
ATTORNEY

INVENTOR.
Frederick L. J. Rehfeld
BY
George E. Johnson
ATTORNEY

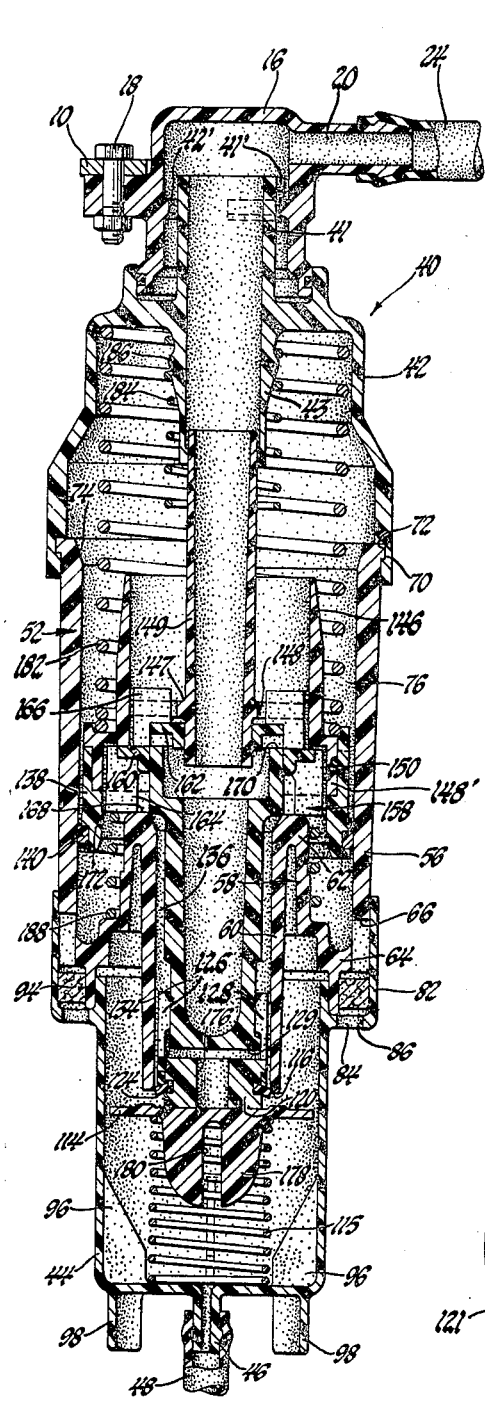
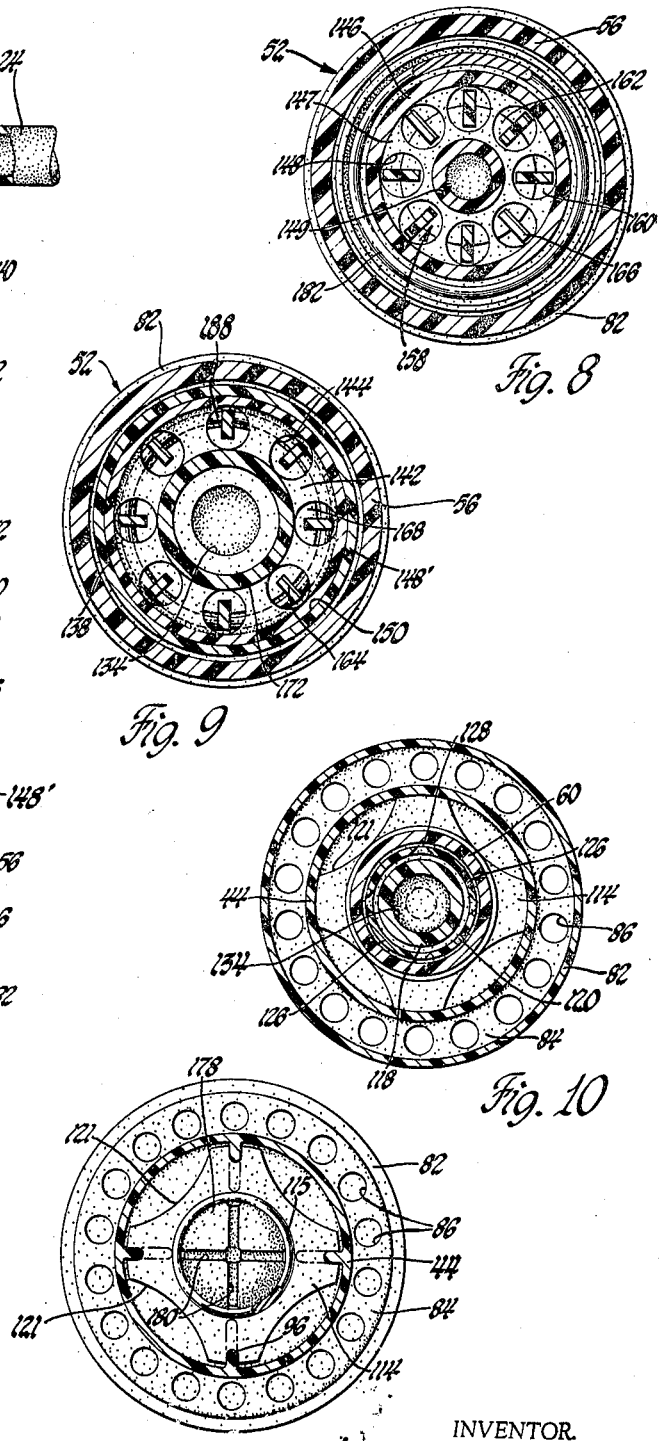
Fig. 7
Fig. 8
Fig. 9
Fig. 10
Fig. 11
INVENTOR.
Frederick L. J. Rehfeld
BY George E. Johnson
ATTORNEY Dec. 9, 1969  F. L. J. REHFELD  3,482,766
VACUUM OPERATED MOTOR AND PUMP COMBINATION
Filed Nov. 13, 1967  4 Sheets-Sheet 4

INVENTOR.
Frederick L. J. Rehfeld
BY
George E. Johnson
ATTORNEY

United States Patent Office 3,482,766
Patented Dec. 9, 1969

3,482,766
VACUUM OPERATED MOTOR AND PUMP
COMBINATION
Frederick L. J. Rehfeld, Saginaw, Mich., assignor to General Motors Corporation, Detroit, Mich., a corporation of Delaware
Filed Nov. 13, 1967, Ser. No. 682,311
Int. Cl. F04b 35/00
U.S. Cl. 230—52
8 Claims

ABSTRACT OF THE DISCLOSURE

An automobile accessory in the form of a vacuum actuable motor and tire pump combination conveniently attachable as a unit to a convenient support for a vacuum power source such as an automobile engine intake manifold.

---

This invention relates to a vacuum operated motor and pump combination and more particularly to an air pump combined with a vacuum actuatable motor in a unit adapted conveniently to be supported and attached or detached for use with a vacuum line as its source of power.

A vacuum operated tire pump has been known for some time as taught, by way of example, in the U.S. Patent 1,488,171 granted Mar. 25, 1924 in the name of A. C. Savidge. However, such pumps have attained no notable commercial success probably because they are inconvenient to use, are lacking in compactness and for other reasons.

A need has arisen for an improved motor and air pump combination which is of compact and light construction, is effective in operation, is easily made at low cost, and which may conveniently be utilized or quickly disassociated from service and stored.

To this end, an object of this invention is to provide an improved and compact vacuum operated motor and pump combination which may be easily, quickly and manually attachable and detachable with respect to a source of power supply and capable of giving an operator maximum ease of application and freedom for dispensing pressurized air produced by the combination.

A feature of this invention comprises vacuum actuatable motor and pump parts retained in a common housing quickly attachable or detachable in connection with a vacuum line for serving the motor. Another feature comprises vacuum motor and pump parts reciprocable in a common housing with a shifting valve also movable with the aid of spring means within the housing to effect pumping action.

These and other important features of the invention will now be described in detail and then pointed out more particularly in the appended claims.

In the drawings:

FIGURE 7 is a sectional view similar to that of FIGURE 5 but showing the parts still positioned at immediately prior to beginning of air admission and continuing with vacuum admission;

FIGURE 8 is a sectional view looking in the direction of the arrows 8—8 in FIGURE 6;

FIGURE 9 is a sectional view looking in the direction of the arrows 9—9 in FIGURE 6;

FIGURE 10 is a sectional view looking in the direction of the arrows 10—10 in FIGURE 6;

FIGURE 11 is a sectional view looking in the direction of the arrows 11—11 in FIGURE 6;

Figure 1:
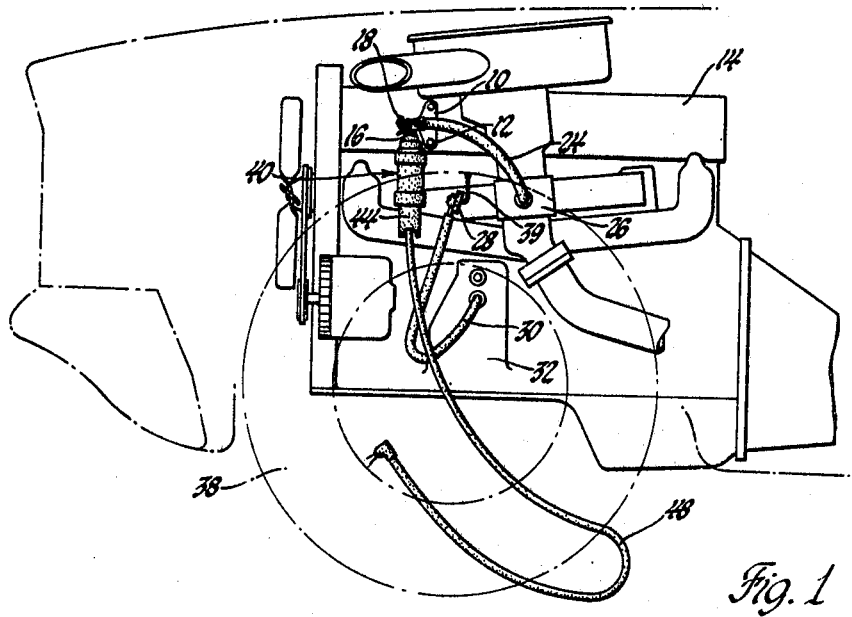
FIGURE 1 is an elevation phantom view of the front end of an automobile showing the engine, and also a motor-pump combination as a unitary accessory or one embodiment of the present invention, the accessory being shown in full lines.
Figure 2:
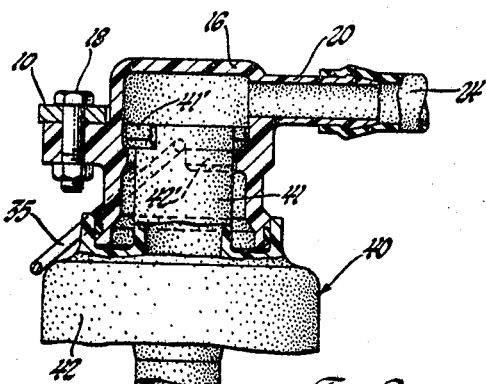
FIGURE 2 is an enlarged sectional view of a support for the combination or accessory of FIGURE 1 as connected for service.
Figure 3:
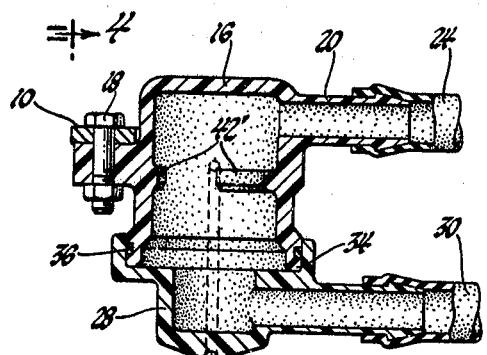
FIGURE 3 is a sectional view of the support shown in FIGURES 1 and 2 as normally employed with a cover attached and with the accessory omitted—i.e., the support being illustrated as in normal automobile usage.

In FIGURE 1, a bracket 10 is bolted as at 12 to the side of the engine 14. An inverted plastic suction cup 16 is attached firmly to the bracket 10 by means of bolts 18. An inlet tube 20 is integral with the cup 16 and is permanently connected by means of a hose 24 to the intake manifold 26 of the engine 14. During normal operation of the vehicle, the hose 24, the cup 16, a cover 28 and a second hose 30 are connected as shown in FIGURE 3 and cooperate to form a continuous vacuum line leading from the crankcase 32 to the intake 26. Normally, then the cover 28, as shown in FIGURE 3, held tightly in place over a rim 34 of the suction cup 16 thereby to provide direct communication between the hoses 24 and 30 so that crankcase ventilation may be effected. Such ventilation is as shown, by way of example, in the U.S. Patent 1,286,930 granted Dec. 10, 1918 in the name of L. G. Buckner and entitled "Vacuum Oil Retainer." A bail 35 serves as a quickly operable element to hold the cover 28 in place and a seal ring 36 prevents leakage.

Figure 4:
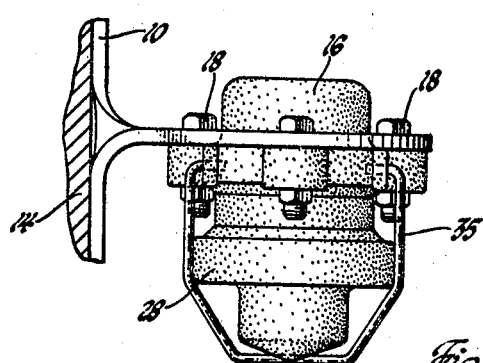
FIGURE 4 is an elevation view of the support looking in the direction of the arrows 4—4 in FIGURE 3.

Assuming that the tire 38 of FIGURE 1 needs air, the unit accessory, or motor-pump combination 40 of the present invention is employed. The bail 35 is snapped off from the cover 28 and the latter with the connected hose 30 is temporarily placed to one side on a hook 39 as depicted in FIGURE 1. An upper end 41 of a casing portion 42 of the accessory 40 is inserted into the opened suction cup 16 and rotated to effect a bayonet type joinder because of the engagement of a tab 41' on the accessory and arcuate ridges 42' inside the cup. The operation of the motor-pump combination 40 occurs as a result of applied vacuum when the engine 14 is started or is running. Pressurized air emits from the bottom end portion 44 of the unit through a nipple or high pressure fluid outlet 46. This air is directed by a hose 48 to the point of use—i.e., the tire 38. When proper tire pressure is reached, the accessory 40 and its hose 48 may quickly be removed and the cover 28 replaced as in FIGURES 3 and 4 to regain functioning of the ventilation device.

The parts of the unit 40 are advantageously all made of plastic with the exception of steel springs. Other materials may be used in the practice of the invention and depending upon the situation. When a suitable plastic is employed, the resulting unit 40 is light in weight and is easily stored and handled with no lubrication being required in its use.

With regard to structural details of the unit 40, the latter comprises an outer housing or casing having an upper portion 42, a lower end or air discharge portion 44, and an intermediate cylindrical body 52.

The intermediate body 52 consists of three coaxial cylinders 56, 58 and 60 made unitary by an impermeable web 62 joining the cylinders 58 and 60, and a web 64 joining the cylinders 56 and 58 and extending coaxially therefrom. There is an annular series of apertures 66 adjacent the web 64 forming part of a low pressure fluid or ambient air intake. One end of the outer or largest cylinder 56 has an annular surrounding rib 70 snapped into a recess 72 formed in the inner rim of the casing portion 42 and it also has a flared mouth 74 at one end of a cylindrical piston space 76. The intermediate cylinder 58 joins the web 62 and 64 and the extended web 64 tightly encloses the upper cylindrical end of the discharge portion 44 of the casing through suitable retention means.

The portion 44 is generally in the form of a cup open at one end and a larger diameter rim 82 is made integral with that end and is adapted tightly to receive an end of the cylinder 56 and it overlaps the apertures 66. A radial web 84 joins the rim 82 to the main body of the discharge cup 44 and this web bears a series of apertures 86. An annular air filter 94 is confined within the rim 82 between the apertures 66 and the apertures 86. Spring centering ribs 96 are formed within the portion 44 and two arcuate shields 98 are provided to protect the connection between the nipple 46 and the hose 48.

A check valve 114 is urged by a spring 115 toward a seat 116 formed upon one end of the cylinder 60 which in turn encloses or guides a high pressure or small diameter piston 118 and a valve head 120. Four notches 121 in the check valve 114 are sufficiently deep to permit free flow of air along the inner wall of the cup portion 44.

Figure 13:
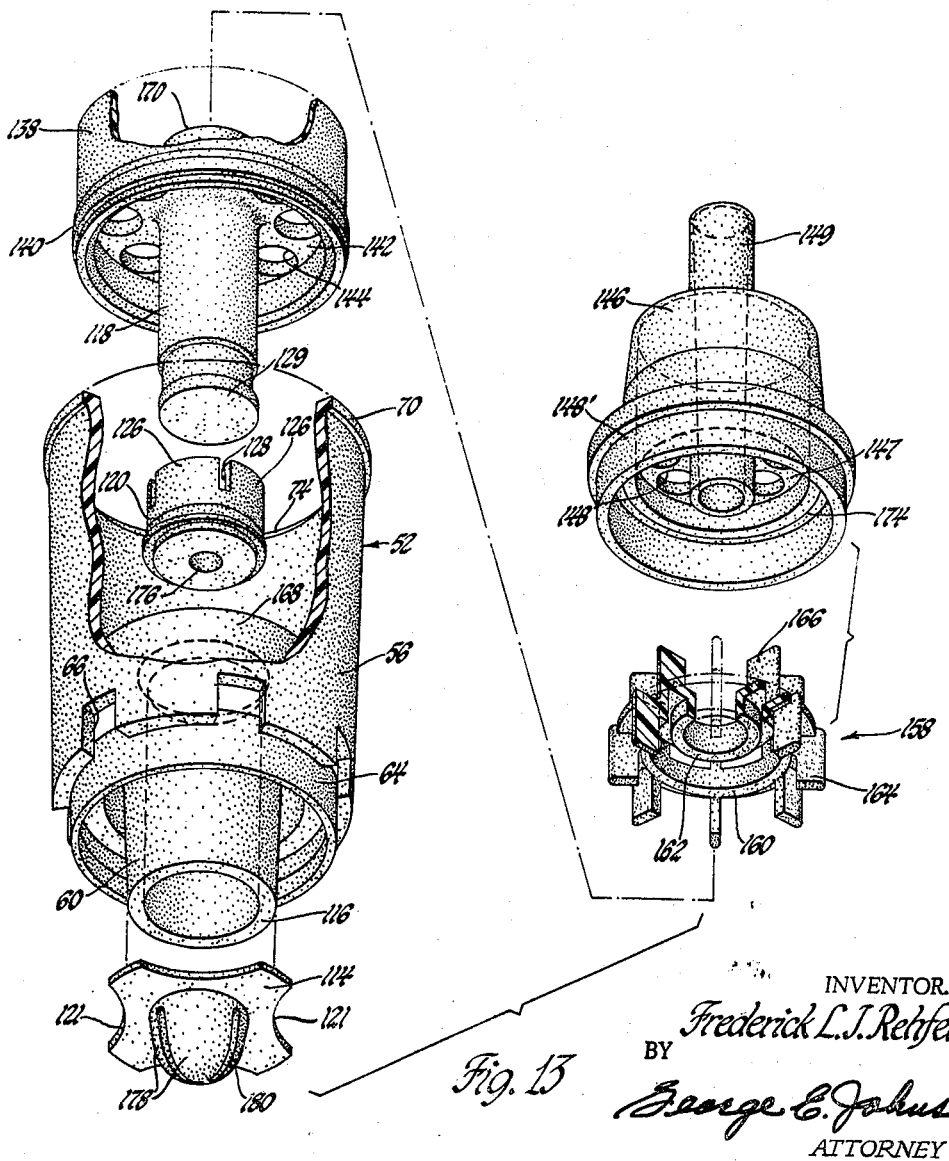
FIGURE 13 is an exploded and perspective view of some of the parts utilized in the motor and pump combination of FIGURE 1 with portions broken away better to illustrate the construction.

The valve head 120 bears a ring 124 sealingly engaging the inside wall of the cylinder 60. That head also is provided with four integral and parallel fingers 126 making a lost motion interlock with the piston 118. Four openings 128 between the fingers are controlled by the relating of the valve head 120 to an end seating surface 129 on the piston 118. Piston 118 is preferably made to define an axial space 134. An annular space 136 is defined between the piston 118 and the inner wall of the cylinder 60 when the piston is lowered as in FIGURE 7. The upper end of the piston 118 has an enlarged diameter portion or large diameter piston 138 (FIGURE 13) bearing a sealing ring 140 and axially slidable within the cylinder 56. A radial web 142 forming a part of the piston 118 has an annular arrangement of eight openings 144. A spring guide 146 bears an annular rim 148' at one end and this rim is held within a recess 150 formed in the piston 138. The guide 146 has an integral web 147 with eight openings 148 and joining the guide to a tube 149. The latter is slidable in a tube 43 which is coaxial with the casing end 41 and constitutes a vacuum inlet.

Coaxial with the vacuum inlet tube 149 and the large piston 138 is a shifting valve 158. This valve is in one piece and is composed of a large annular ring 160 and a small annular ring 162. Each ring has a right angle cross section when considered in a radial plane. Eight fingers 164 depend from the large ring 160 and are movable in the openings 144 of the large piston 138. Eight fingers 166 extend upwardly from the large ring 160 and connect the two rings. The fingers 166 also freely pass through the openings 148 in the web 147.

The web 62 presents an annular and upward facing seat 168. The piston 118 presents an upwardly facing annular seat 170 adapted to engage the underside of the ring 162 and formed on an enlarged end 172 of the piston. An annular and downwardly facing seat 174 is formed on the spring guide 146 and is adapted to engage the upper side of the ring 160. A port 176 in the valve head 120 is adapted to be closed by engagement of the latter with the sealing surface 129.

The check valve 114 has four depending fingers 178 separated by slots 180 so the path of air to the nipple 46 at no time will be impeded. The fingers 178 also cooperate with the ribs 96 in centering the spring 115 acting between the base of the casing part 44 and the valve 114.

A main spring 182 acts between the upper end of the casing and the spring guide 146. A smaller spring 184 has its upper end retained on the tube 43 by an enlargement 186 on the tube. The lower end of the spring 184 is adapted to contact the shifting valve 158 only at times as will appear during the description of the operation. A second spring 188 for intermittently acting upon the valve 158 has its lower end fixed to the base of the cylinder 58.

Figure 5:
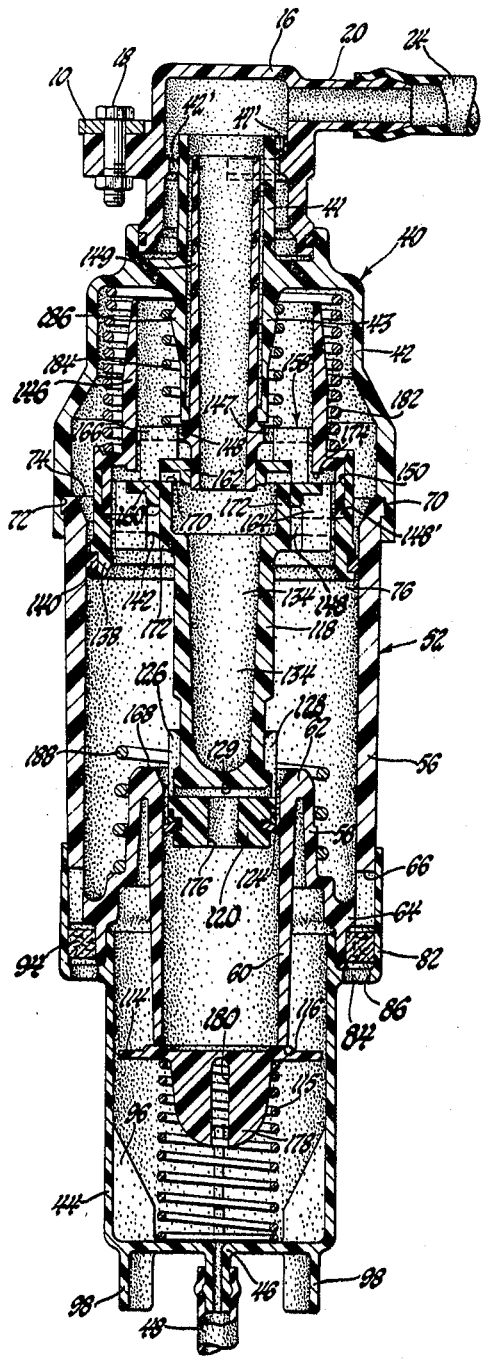
FIGURE 5 is an enlarged sectional view of the accessory of FIGURE 1 and its support, the parts being relatively positioned as at near the end of an air admission stroke and immediately prior to vacuum cut-off.
Figure 6:
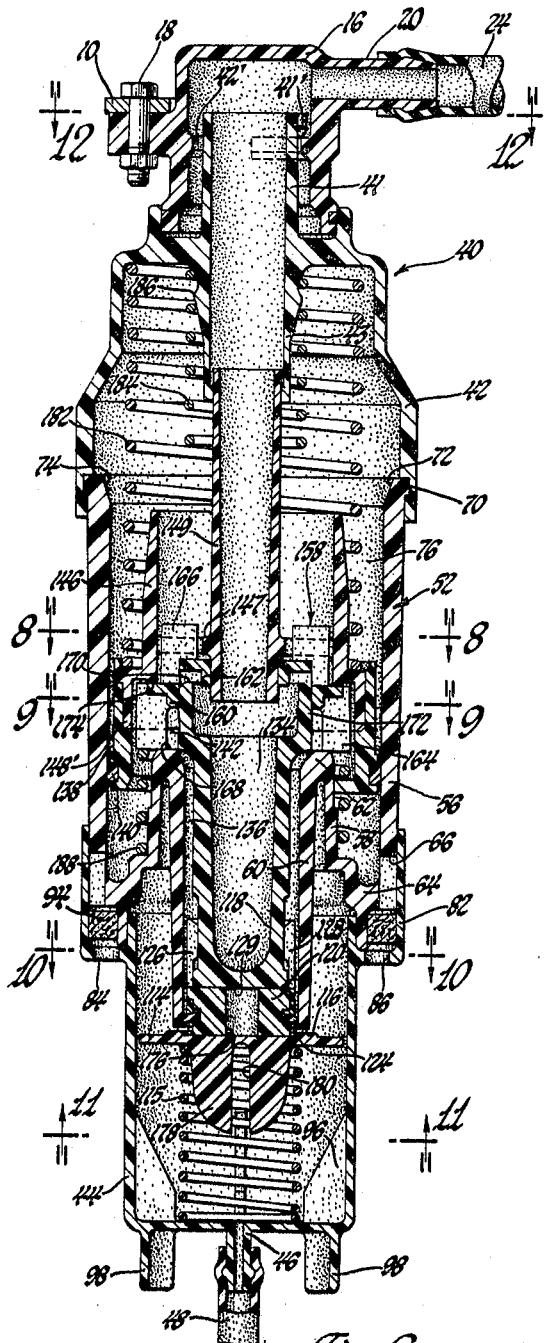
FIGURE 6 is a sectional view similar to that of FIGURE 5 but showing the parts positioned as at the end of air discharge, immediately prior to air admission, and with vacuum admission.
Figure 12:
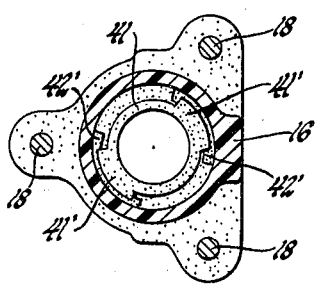
FIGURE 12 is a sectional view looking in the direction of the arrows 12—12 in FIGURE 6.

In the operation of the motor-pump combination and assuming the engine 14 is running and connections are established as i FIGURE 1, vacuum is constantly maintained in the small piston chamber 134. In FIGURE 5 the parts are positioned so that the spring 184 is in the act of shifting the valve 158 to seat the ring 162 on the surface 170. Ambient air has entered through the filter 94, the piston space 76, the slots 128, and the port 176 and into the cylinder 60 beneath the valve head 120. The check valve 114 is closed by means of the spring 115 and back pressure from the hose 48 but the air is not trapped in the cylinder 60 at this stage. When vacuum is cut-off at the seat 170, air entering by the seat 174 aids the main spring 182 and forces the large piston 138 and the small piston 118 down and into the positions shown in FIGURE 6. The surface 129 in the small piston 118 has engaged the valve head 120 and the trapped air in the cylinder 60 has unseated the valve 114 after the combined forces of the spring 115 and the back pressure has been overcome.

Spring 188 has, however, come into action and has shifted the valve 158 upwardly to cut off ambient air at the seat 174. Vacuum enters by the seat 170 and the spring 182 is overcome, When the small piston 118 stops, the inertia of the valve head 120 and the check valve 178 overcomes the spring 115 sufficiently that the valve head 120 becomes unseated from the surface 129 as in FIGURE 7. Continued upward movement of the piston 118 carries the valve head 120 with it because of the fingers 126. The valve 114 then seats on the surface 116 and air admission by the seat 168 becomes effective for the next stroke to begin as in FIGURE 5. The shifting valve fingers 164 and 166 consecutively contact the springs 188 and 14 respectively and trigger the reversals.

The pump will stop when a predetermined air pressure is attained in the air discharge line 48. When this happens the assembly of the two pistons 138 and 118 will stop before the fingers 164 will contact the spring 188 and shift the valve 158 and the predetermined air pressure at pump discharge will not be exceeded.

I claim:

1. A vacuum operated pump arrangement comprising vacuum actuatable motor and air pump parts cooperatively retained in a common housing, a suction cup forming part of a vacuum line mounted on a support, said housing having one portion defining a vacuum inlet leading to said motor parts, means detachably connecting said housing portion to said suction cup, said connecting means being manually detachable, a low pressure air intake in said housing and leading to said pump parts, a second portion of said housing having a high pressure air outlet as a discharge passage for said pump, and means for connecting said high pressure outlet to a point of use.

2. A vacuum operated pump arrangement comprising vacuum actuatable motor and air pump parts reciprocable in a common housing, a vacuum line mounted on a support, an opening in said vacuum line, bayonet type connecting means between said housing and line, one portion of said housing having a vacuum inlet leading from said vacuum line opening, a low pressure air intake in said housing and leading to said air pump parts, a second portion of said housing having a high pressure air outlet as a discharge passage from said pump parts, and means for connecting said high pressure air outlet to a pressurized zone such as a tire.

3. A vacuum operated pump arrangement comprising a housing, vacuum actuatable motor and air pump parts including small diameter and large diameter pistons retained for simultaneous reciprocation in said housing, a vacuum line mounted on a support, an opening in said vacuum line, means detachably connecting said housing to said vacuum line opening, one portion of said housing having a vacuum inlet leading from said opening to said motor parts, an atmospheric pressure air intake in said housing and leading to said motor and pump parts, a second portion of said housing having a high pressure air outlet as part of a discharge passage leading from said pump parts, said motor and pump pistons being fixed together and movable as a unit, spring means for driving said pistons in one direction, valve means coaxial with said pistons and with relation to the latter whereby determining air flow through said housing, spring means for shifting said valve means near each end of a stroke of said pistons, and means for connecting said high pressure air outlet to a pressurized zone of use.

4. A vacuum operated pump arrangement comprising a housing, a vacuum actuable motor and pump parts including small and large pistons arranged to reciprocate together in said housing, one portion of said housing having a vacuum inlet leading to a large piston of said motor, a low pressure air intake in said housing and leading to said pistons, a second portion of said housing having a high pressure air outlet leading from said housing, spring means in said housing urging said pistons in one direction, reciprocable valve means located and movable within said housing for controlling the flow of vacuum to said motor parts from said vacuum inlet and of low pressure air from said intake to said pistons, spring means being arranged alternately to act in opposite directions against said reciprocable valve means to reverse direction of movement of said pump and motor parts at each end of a range of travel, and means for connecting said high pressure air outlet to a pressurized zone.

5. A vacuum operated pump arrangement as set forth in claim 4, said motor parts including a large diameter piston slidable in a bore of large diameter in said housing, a cylinder in said housing forming one of said pump parts and having a bore of smaller diameter, a small diameter piston slidable in said small diameter bore and forming one of said pump parts, a valve space of fixed dimensions defined between said large and small pistons, means joining said pistons for unitary movement, said valve means being movable in said valve space and with relation to said pistons and check valve means in said second portion of said housing and adapted to close one portion of said small diameter bore during a suction stroke of said pump parts and to open said small diameter bore to said high pressure air outlet during a pressure stroke of said pump parts.

6. A vacuum operated pump arrangement as set forth in claim 4, said pistons being joined to reciprocate as a unit, opposed valve seats on said pistons, and said valve means being shiftable with relation to said pistons and arranged to seat on one of said seats to close off flow of low pressure air from said intake to said one portion of said housing and alternately seat on another of said seats to close off the flow of said low pressure air to another portion of said housing.

7. A vacuum operated pump arrangement as set forth in claim 4, said pistons being coaxial with each other, and a large piston of said pistons being provided with a coaxial vacuum inlet tube slidable in said one portion of said housing and communicating with said vacuum inlet.

8. A vacuum operated pump comprising an elongated cylindrical housing, a small piston and a large piston joined together and slidable in coaxial relation with said housing, a shiftable valve reciprocally mounted with relation to said pistons and coaxial therewith, triggering spring means arranged alternately to said valve in opposite directions along the axis of said housing, a large and small cylindrical spaces defined in said housing and slidably retaining said large and small pistons respectively, a main spring acting in said large piston, a vacuum inlet at one end of said housing, an air inlet in said housing, a high pressure air outlet at the other end of said housing, said shiftable valve cooperating with said spring means and pistons to seat on the latter alternately to cut-off and admit air from said air inlet to said housing, and the arrangement being such that vacuum from said vacuum inlet may alternately effect a pumping stroke by the application of air pressure from said air inlet supplemented by a force exerted by said main spring means. against said large piston.

References Cited

UNITED STATES PATENTS

| 2,510,649 | 6/1950 | Neff | 230—52 |
| 2,597,672 | 5/1952 | Rappl | 230—52 |

ROBERT M. WALKER, Primary Examiner